Aug. 26, 1969     E. R. STROUP     3,463,673

ELECTROCHEMICAL COULOMETER AND METHOD OF FORMING SAME

Filed Sept. 12, 1967

INVENTOR,
EUGENE R. STROUP

BY

ATTORNEYS

United States Patent Office 3,463,673
Patented Aug. 26, 1969

3,463,673
ELECTROCHEMICAL COULOMETER AND
METHOD OF FORMING SAME
Eugene R. Stroup, Arlington, Va., assignor to the United States of America as represented by the Administrator of the National Aeronautics and Space Administration
Filed Sept. 12, 1967, Ser. No. 667,636
Int. Cl. H01m 35/18, 43/04; G01r 29/00
U.S. Cl. 136—182                                  6 Claims

ABSTRACT OF THE DISCLOSURE

This invention relates to a coulometer cell of the secondary alkaline type formed by flooding the cell with electrolyte and passing a forming current in two directions through the cell with the attainment of oxygenol voltage and hydrogenol voltage in each direction.

---

Figure 1:
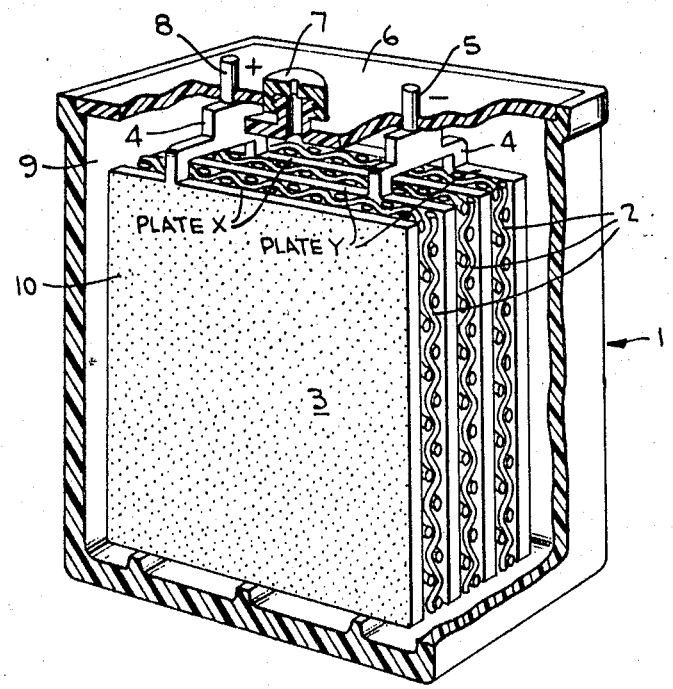

The invention described herein was made by an employee of the United States Government and may be manufactured and used by or for the government for governmental purposes without the payment of any royalties thereon or therefor.

This invention relates to a secondary alkaline electrochemical cell and a method of making same. More particularly, this invention relates to a novel type of coulometer which exhibits a high degree of reliability and stability.

The coulometer, as its name implies, is a device that measures coulombs, (ampere-seconds) and which may be designed to yield a signal after a specific quantity of electrical charge has passed through the device. The signal produced may in turn be used to control an electric circuit, e.g. a recharge circuit for a secondary battery. The use of coulometers in recharging circuits for secondary batteries has been of recent importance due to the need for effectively controlling the recharge of secondary cells when attendant monitoring is not possible, e.g. in satellite operations. Generally, a storage or secondary battery is recharged by the passage of electric current therethrough until the quantity of charge passed (the ampere-hours) is equal to or greater than the charge removed during discharge of the battery. When a battery attains its fully charged state, further passage of current in the charging direction results in wasteful electrolysis of the electrolyte with attendant gas evolution. In order to maintain stability and reliability of operation of a storage battery in a circuit, it is necessary to effectively and precisely control the recharge of the batteries.

It is therefore the object of the instant invention to provide coulometers which will exhibit the necessary stability and reliability of operation as primary charge control devices in secondary battery recharge circuits.

It is still another object of the present invention to provide a method for forming coulometers which may be used in satellite applications.

These and other objects of the present invention will become apparent from a consideration of the drawing and the following detailed description and claims.

In the drawing which illustrates an embodiment of the invention and its formation:

FIG. 1 is a perspective view partly in section of one embodiment; and

Figure 2:
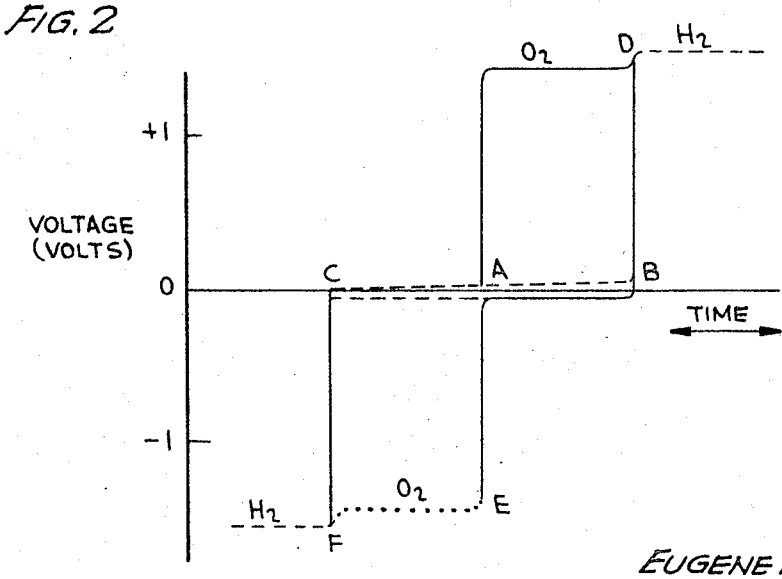

FIG. 2 graphically represents the forming cycle for a cadmium-cadmium coulometer.

The cells of this invention are constructed in the same general fashion as the nickel-cadmium cells used in spacecraft and commercial batteries that power such items as flashlights, knives, drills, etc. Due to this relationship, both the coulometer and the space cell yield comparable lifetime performance characteristics. The coulometer of this invention comprises an electrochemical cell having a pair of reversible electrodes immersed in an electrolyte. The electrodes should have substantially the same electrode potential so that the voltage across the cell is small. The cell is adapted to develop a substantial and abrupt change of voltage between its electrodes when more than a definite quantity of electricity has passed through the cell. This abrupt voltage change corresponds to the onset of a charge in the electrochemical process occurring at one or both electrodes, such as the onset of gas evolution. This increased voltage is then used as a controlling signal in an electric circuit. For example, in a recharge circuit for a secondary battery the coulometer is placed in series with the battery so that the amount of charge is measured as a function of the amount of discharge and a voltage signal is emitted when the charge equals the amount discharged and the charge rate can be reduced to a safe level.

Preferably, the electrodes are chosen to have the same electrode potential, but they may differ as long as the difference between the electrode potentials is less than the voltage which develops across the cell when more than the definite quantity of electricity has passed through the cell so that the change in voltage can control an electric circuit. Usually, the difference between the electrode potentials will be less than .050 volt.

In the preferred embodiment, cadmium is employed in the electrodes. Thus, the electrodes may consist of a suitably conductive support material with the active material thereon consisting either of Cd metal or an insoluble salt of that metal, e.g. $Cd(OH)_2$. In operation, the active material goes into its higher valence state at the oxidation electrode and its lower state at its reduction electrode. Using cadmium, therefore, the oxidation reaction at the positive electrode would be

$$Cd + 2OH^- \rightarrow Cd(OH)_2 + 2e^-$$

and the reduction reaction at the negative electrode would be $Cd(OH)_2 + 2e^- \rightarrow Cd + 2OH^-$. As is apparent to one skilled in the art, other types of electrode systems are possible as long as an abrupt voltage change through the cell is realized upon the commencement of a change in the electrochemical process occurring at one or both of the electrodes. Examples of such systems include those disclosed in Patent 3,302,091, Table I.

The electrolyte used may be any enabling ion transfer within the cell. A typical example is an alkaline solution of water and 30% KOH.

In order to electrically separate the plates of one pole from those of the other, non-conductive sheets are placed therebetween. These separators should be porous so as to permit the gases formed by the natural functioning of the cells to pass easily therethrough. A nonwoven nylon fabric has proven to be particularly suitable. The plate separation in a cadmium-cadmium coulometer should be at least 10 mils and may be as large as 20 mils for most applications.

In the embodiment of the invention illustrated by FIGURE 1, the coulometer consists of a number of plates X and Y alternately arranged and a thin non-woven fabric 2 separating the plates. The plates can be obtained from a discharged, dismantled alkaline storage battery of the sintered plate nickel-cadmium type, consisting of a porous sintered nickel support 3 in the pores of which a thin layer of cadmium hydroxide 10 has been deposited. Metal tabs 4 welded to the plates designated X are connected together and to an external connection 8 labeled positvie. The plates designated Y are similarly connected together and to the external electrical connection 5 labeled negative. The plate assembly is placed in an outer container 1 of alkali inert material such as plastic, nylon, or metal such as nickel or stainless steel, shaped as a rectangular solid. A top 6 is provided for the container through which the electrical connections 5 and 8 to the plates are passed, and through which a vent 7 is provided for filling the container with electrolyte 9 and for the escape of gases during the initial charging and forming operation. The coulometers of this invention do not necessarily have to be of the above design. Any of the designs used for conventional nickel-cadmium secondary batteries, e.g. with spiral or rolled plates may be used.

After the cell is assembled, an amount of an electrolyte e.g. 2–30% KOH solution, is added which will completely saturate the separator material 2, fill the pores in the plates and fully cover the plates with liquid. This so called "flooded" condition is necessary to insure proper formation of the coulometer.

FIGURE 2 is a graphical representation of the forming operation using as an example, a cadmium-cadmium cell. After the cell is "flooded" with electrolyte a current of $C/10$, where C=rated capacity of the electrode, is passed through the vented cell. Just before the current is passed through the cell substantially all the active material on the plates is in the form of cadmium oxide or hydroxide. Starting at point A in FIGURE 2, at the instant of commencement of the forming cycle, one finds that the voltage rises directly to an oxygen generating plateau. This oxygenol voltage is described electrically as approximately 1.45 volts. During this time the material on plate Y is reduced, evolving gaseous oxygen. In five to seven hours, the voltage rises to the hydrogen generation plateau, D. This hydrogenol voltage is described electrically as approximately 1.55 volts. At some time after the hydrogen plateau is reached, the forming current is reversed through the cell and the voltage falls to point B where it continues to point A, requiring the same amount of time as the time spent on the oxygen plateau. It than falls from point A to point E, the opposite oxygen plateau at approximately $-1.45$ volts.

The time it remains on this plateau as shown by the dotted line is a function of the amount of electrolyte in the cell. At a given point in time, the opposite hydrogen plateau F will be reached at approximately $-1.55$ volts. The current is then interrupted and the graph returns to point C at which time the formation cycle is complete. At this point in time, the traces of residual oxygen are pumped out and the cell is sealed and ready for used. As shown by the graph, the hydrogen plateaus in each direction must be reached before the current is reversed and then terminated. It is preferred (not shown by the graph) that the time spent on each hydrogen plateau be equal to the time on the respective oxygen plateaus. This preferred procedure has proven to give superior results as regards the reliability and stability of the formed cell. As is evident to one skilled in the art, the capacity stability of the coulometer depends upon the removal of as much of the "free and mobile oxygen" as is possible.

The magnitude of the forming current and the amount of time on each plateau in the foregoing example should not be construed as limiting in the formation cycle. The magnitude of the forming current and the corresponding variables, including the amount of time on each plateau, may be varied so long as the formation of the cell is completed in two directions including the attainment of the hydrogenol voltage in each direction.

As many widely different embodiments of this invention may be made without departing from the spirit and scope thereof, it is understood that the invention is not limited to the specific embodiments thereof except as defined by the appended claims.

I claim:
1. An electrochemical coulometer cell comprising:
 (a) a sealed vessel containing a body of electrolyte;
 (b) a pair of electrodes mounted in contact with said electrolyte;
 (c) each electrode consisting essentially of an inert support and solid active material, said active material being present in both reduced and oxidized states;
 (d) said cell having been formed prior to sealing by
  (i) charging the vented vessel containing the electrodes therein with electrolyte to substantially flood the electrodes;
  (ii) passing forming current through the cell, whereupon an oxigenol voltage is realized, further passing the forming current through the cell at least until a hydrogenol voltage is attained; and
  (iii) thereafter reversing the forming current and repeating step ii and interrupting the current flow upon completion thereof and sealing the cell.

2. The coulometer of claim 1, wherein the forming current is passed through the cell after the hydrogenol voltage is reached for a time equal to the time said current is passed through the cell at the oxygenol voltage.

3. The coulometer of claim 1, wherein the active material is cadmium or a salt thereof.

4. A method of forming a coulometer cell comprised of:
 (a) a vented vessel containing a body of electrolyte
 (b) a pair of electrodes mounted in contact with said electrolyte;
 (c) each electrode consisting essentially of an inert support and solid active material, said active material being present in both reduced and oxidized states;
 (d) which method comprises
  (i) charging the vented vessel containing the electrodes therein with electrolyte to substantially flood the electrodes;
  (ii) passing forming current through the cell, whereupon an oxygenol voltage is realized, further passing the forming current through the cell at least until a hydrogenol voltage is attained; and
  (iii) thereafter reversing the forming current and repeating step ii and interrupting the current flow upon completion thereof and sealing the cell.

5. The method of claim 4, wherein the forming current is passed through the cell after, the hydrogenol voltage is reached for a time equal to the time said current is passed through the cell at the oxygenol voltage.

6. The method of claim 5 wherein the active material is cadmium or a salt thereof.

References Cited

UNITED STATES PATENTS

| | | | |
|---|---|---|---|
| 2,988,590 | 6/1961 | Andre | 136—182 |
| 3,302,091 | 1/1967 | Henderson | 136—182 XR |

WINSTON A. DOUGLAS, Primary Examiner

D. L. WALTON, Assistant Examiner

U.S. Cl. X.R.

136—6; 320—48; 324—94